United States Patent
Gram

(10) Patent No.: US 7,150,845 B1
(45) Date of Patent: Dec. 19, 2006

(54) MOULD WITH TURNABLE MIDDLE SECTION

(76) Inventor: Jes Tougaard Gram, Bishop Svanes Vej, 5, Birkerød (DK) 3460

( * ) Notice: Subject to any disclaimer, the term of this patent is extended or adjusted under 35 U.S.C. 154(b) by 0 days.

(21) Appl. No.: 09/979,687

(22) PCT Filed: May 15, 2000

(86) PCT No.: PCT/DK00/00261

§ 371 (c)(1),
(2), (4) Date: Apr. 24, 2003

(87) PCT Pub. No.: WO00/73040

PCT Pub. Date: Dec. 7, 2000

(30) Foreign Application Priority Data

May 17, 1999  (DK) .............................. 1999 00670

(51) Int. Cl.
*B29C 45/04* (2006.01)
*B29C 45/14* (2006.01)
*B29C 45/16* (2006.01)

(52) U.S. Cl. .............. 264/254; 264/255; 264/275; 264/297.2; 264/328.8; 425/116; 425/127; 425/129.1; 425/572; 425/576

(58) Field of Classification Search .............. 264/250, 264/254, 255, 259, 271.1, 279, 279.1, 328.1, 264/328.8, 275, 297.2; 425/528, 533, 534, 425/537, 538, 540, 576, 129.1, 572, 116, 425/127

See application file for complete search history.

(56) References Cited

U.S. PATENT DOCUMENTS

| | | | |
|---|---|---|---|
| 3,224,043 A | | 12/1965 | Lameris et al. |
| 3,707,591 A | * | 12/1972 | Chalfant .................... 264/520 |
| 3,985,485 A | * | 10/1976 | Farrell ........................ 425/516 |
| 4,449,913 A | * | 5/1984 | Krishnakumar et al. .... 425/548 |
| 4,734,023 A | | 3/1988 | Nesch et al. |
| 4,744,741 A | * | 5/1988 | Glover et al. ................ 425/123 |

(Continued)

FOREIGN PATENT DOCUMENTS

JP            2143819         6/1990

(Continued)

*Primary Examiner*—Edmund H. Lee
(74) *Attorney, Agent, or Firm*—Ladas & Parry LLP

(57) ABSTRACT

A method and molding tool for the molding of both one- or multi-component parts preferably comprising plastic material which may be integrated together with parts of another material, such as steel and copper, where the turnable middle section during the molding process is supplied with material on at least one of the surfaces thereof, that in contrast to the normal procedures are not at a right angle to the closing direction between the stationary mold part and the movable mold part of the tool. This can be realized by molding a part or a piece of a part and/or by molding around a special part for the in-molding on at least one of these surfaces of the turnable middle section. This molding and/or insertion can take place while the tool is closed and can be performed on several surfaces at the same time in order to save cycle time. The tool according to the invention can substitute or supplement a jaw tool because the turnable middle section in connection with the opening and closing of the stationary mold part and the movable mold part makes these serve as an extra set of jaws.

38 Claims, 5 Drawing Sheets

U.S. PATENT DOCUMENTS

| | | | | |
|---|---|---|---|---|
| 4,885,121 A | * | 12/1989 | Patel | 264/255 |
| 5,030,406 A | * | 7/1991 | Sorensen | 264/255 |
| 5,169,655 A | * | 12/1992 | Von Holdt, Sr. | 425/547 |
| 6,036,908 A | * | 3/2000 | Nishida et al. | 264/254 |
| 6,086,808 A | * | 7/2000 | Sorensen et al. | 264/250 |
| 6,372,171 B1 | * | 4/2002 | Sorensen et al. | 264/278 |
| 6,447,280 B1 | * | 9/2002 | Grimm | 425/116 |
| 6,551,543 B1 | * | 4/2003 | Keller et al. | 264/478 |
| 6,555,037 B1 | * | 4/2003 | Payne | 264/40.7 |

FOREIGN PATENT DOCUMENTS

| | | |
|---|---|---|
| JP | 8108449 | 4/1996 |
| WO | WO9835808 | 8/1998 |
| WO | WO9838021 | 9/1998 |

* cited by examiner

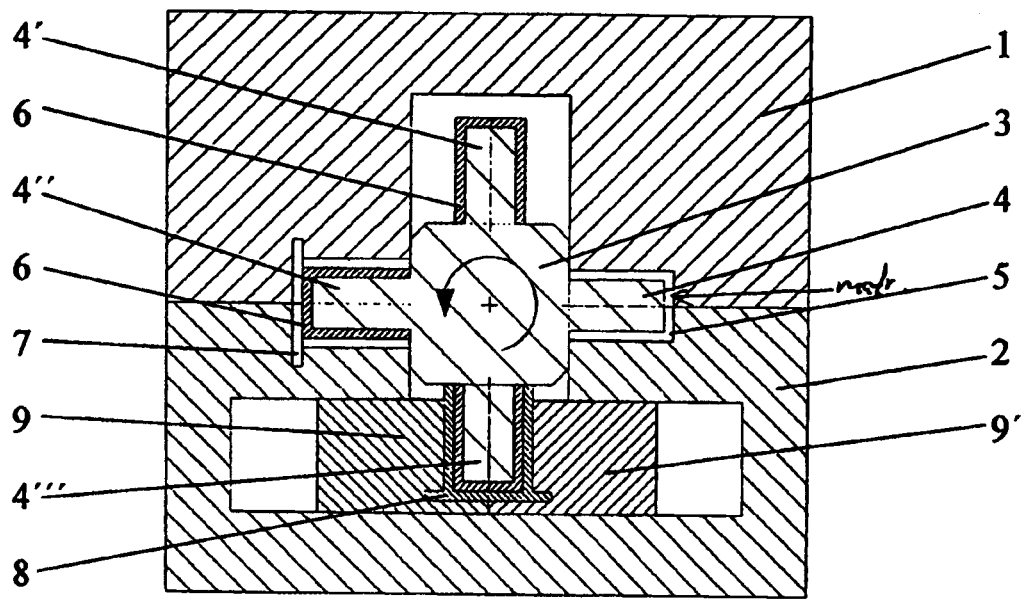
Figur 1
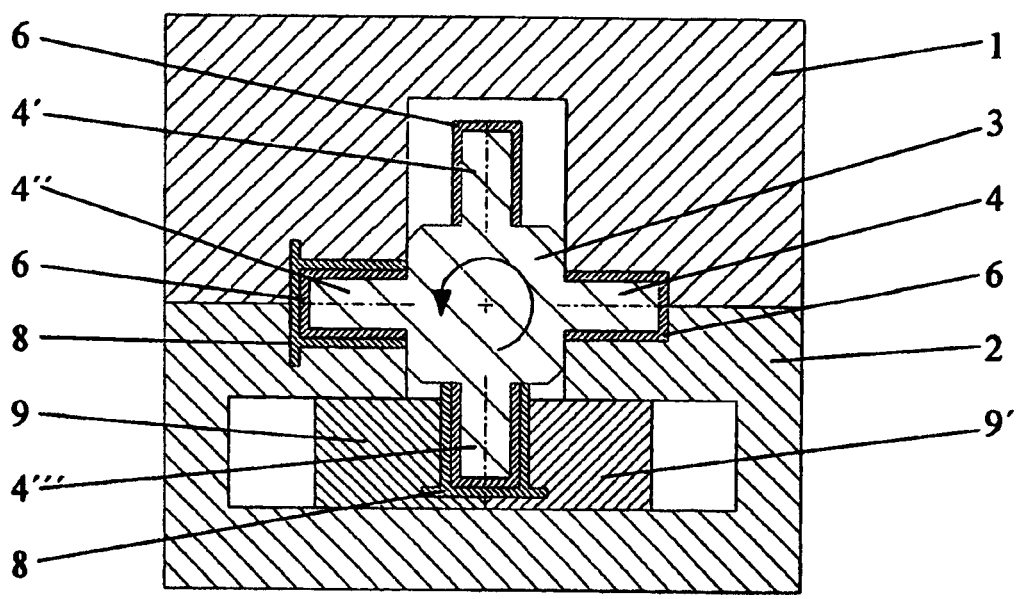
Figur 2

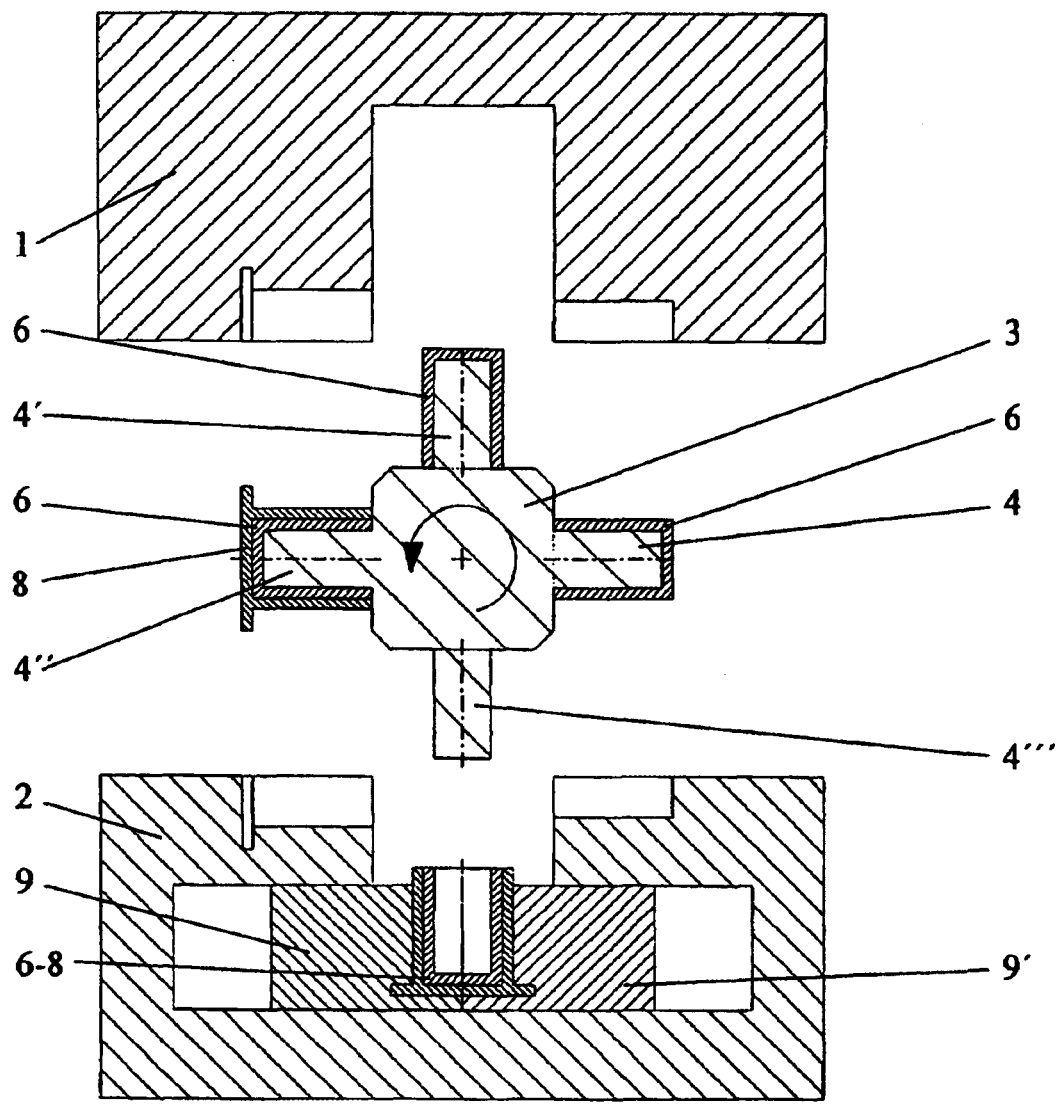
Figur 3

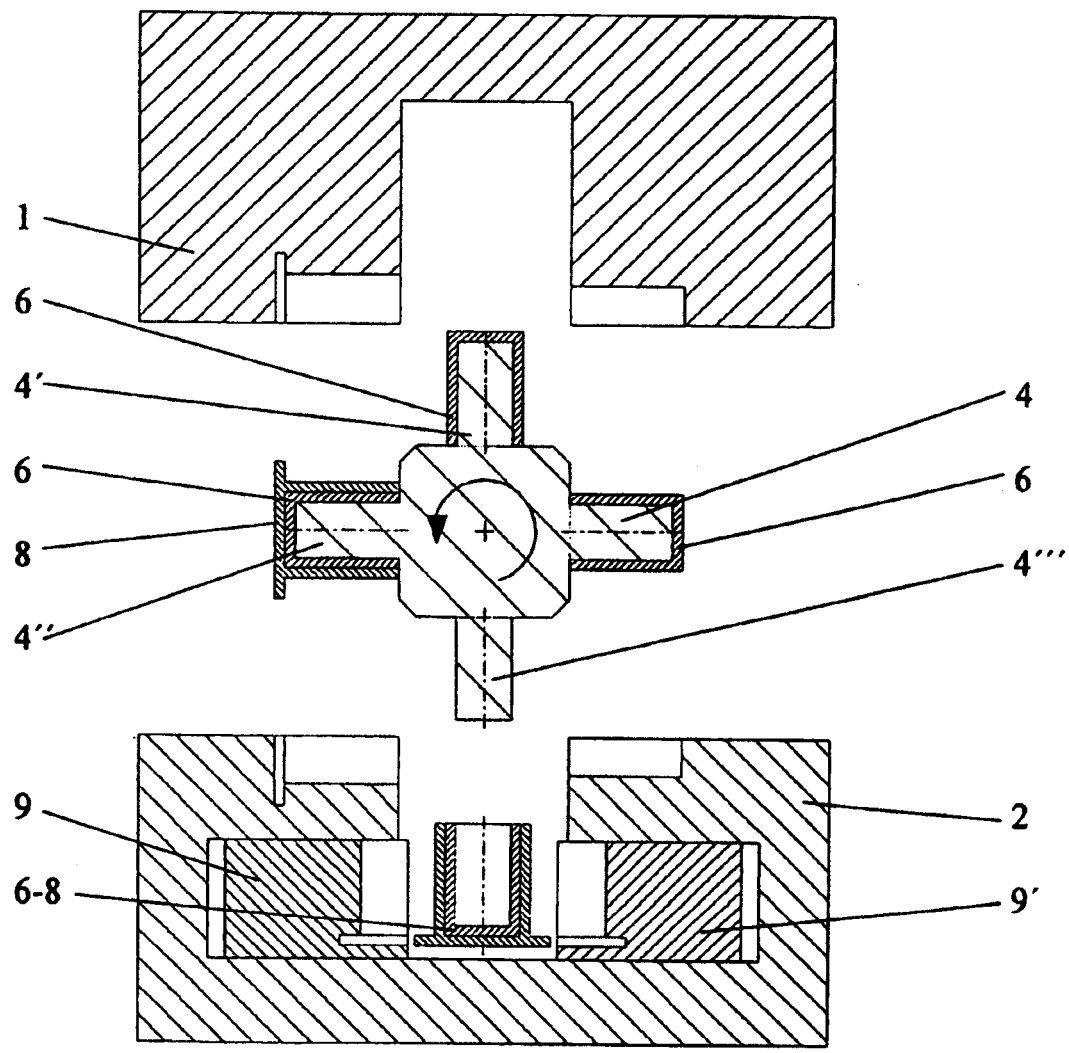
Figur 4

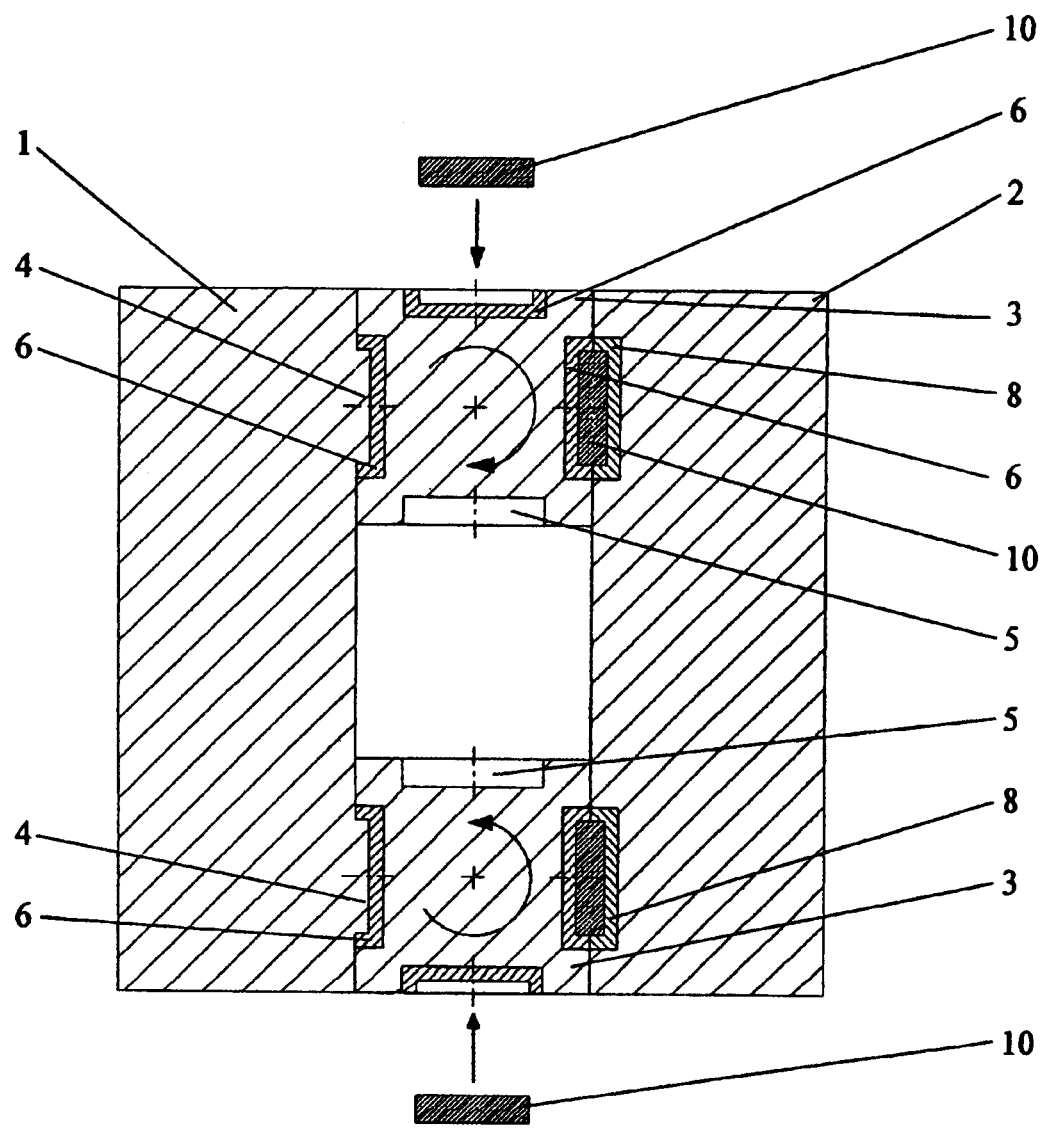
Figur 5

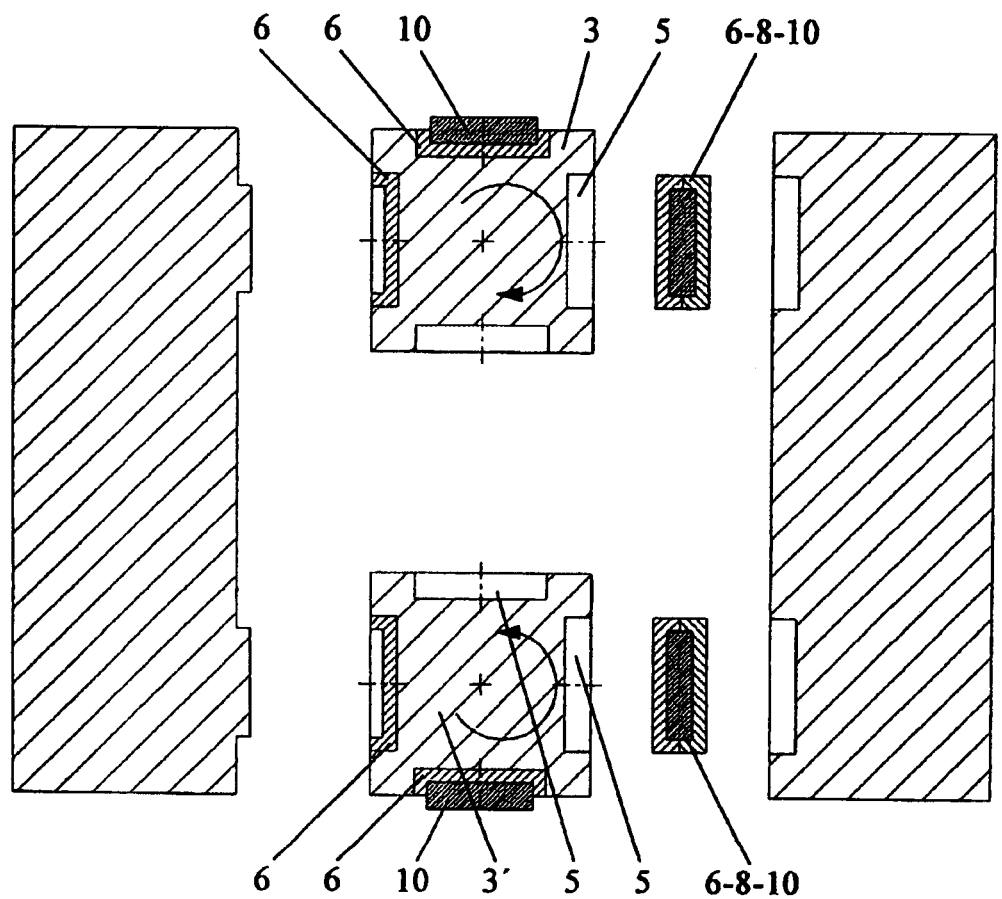
Figur 6

MOULD WITH TURNABLE MIDDLE SECTION

The invention concerns a procedure for the production of parts preferably of plastics, both one-component as well as multi-component, in a tool equipped with at least one turnable middle section, and a machine for the performance of the procedure.

BACKGROUND

There is known a number of different procedures for injection-molding of plastic parts in a tool or a mold, which is equipped with at least one turnable middle-section. An example of this is e.g. the in my international patent application No. WO 98/35808 described procedure and machinery for the production of two- or multi-component parts of plastics.

The up till now described procedures and machinery for the production of parts like this have various disadvantages or flaws. These are tried to be corrected with the procedure and machinery according to the invention. Hereby are also achieved a number of advantages and simplifications of the hitherto known molding-processes, which considerably will be able to decrease the cycle-time and consequently the price of the finished parts.

SUMMARY OF THE INVENTION

The invention is characterized by the fact, that the turnable middle section is supplied with material on/at at least one of the surfaces/areas in the turnable middle section, which is not placed at a right angle of the closing direction of the tool, e.g. by molding a part or a piece of a part, and/or by inserting a special part for the in-molding on at least one of the surfaces/areas of the turnable middle section.

The turnable middle section of the tool preferably has a cross section with the outline of a regular polygon, preferably a square. This square can suitably have the corners cut off so a smaller opening of the mould will be sufficient to turn the middle-section around. For the same reason the middle-section can suitably be parted into two or more turnable mold-parts. Besides the square or an adapted square the cross-section of the turnable middle-section can have the outline of a regular hexagon, an octagon or another preferably regular polygon, where the two opposite placed sides are parallel.

BRIEF DESCRIPTION OF DRAWINGS

The various uses and advantages of the procedure and machinery according to the invention are specified under the description of the drawing, where FIG. 1 shows a tool according to the invention in its first cycle of four phases seen from above in closed position, FIG. 2 shows the same in a following cycle also seen from above in closed position, FIG. 3 shows the same in open position, where the turning of 90 degrees in the direction of the arrows can take place, FIG. 4 shows the same, where the jaws also are opened, so that the finished combined parts are released, FIG. 5 shows one for the inserting intended tool according to the invention with two turnable middle-sections seen from above in closed position, and FIG. 6 the same in open position.

DETAILED DESCRIPTION

In FIG. 1 are shown a tool according to the invention for the two-component molding with the stationary mold-part 1, the movable mold part 2 and the turnable middle-section 3. On the turnable middle-section 3 there is on each of the four sides placed a core, which positions in the four phases of the molding respectively are marked as 4, 4', 4" and 4'". In the beginning of the first phase the core 4 is placed at the right and situated in the cavity 5 between the stationary mold part 1 and the movable mold part 2. In the second phase the placing of the core 4' is in the top-position, where there in the mold cavity is molded the inner piece of the part 6. In the third phase, where the core 4" is in a position at the left on the figure, the molded piece of the part 6 is still placed on it. The molded and cooled piece of the part 6 now serves as a part of the mold, namely as the inner parting line of the cavity for the next piece of the part in connection with the outer mold cavity 7. In the fourth and the last phase of the start, there is shown as the core 4'" in its lowest position, is the final molding of the part 8 made in the outer mold cavity 7. In the movable mold part 2 are noticed the two jaw parts 9 and 9', which at their later opening makes the ejection of the then complete molded combined part 6-8 possible, but which here has caught and still is holding this. But as it will be seen from the figure, there is plenty of space for placing e.g. hot-runners, preferably in the stationary mould part 1 as in the ordinary molding tools.

FIG. 2 shows the same tool in closed position in one of the cycles that follows after the first cycle shown on FIG. 1. In the phase to the right on the core 4 there is in the mould cavity molded the innermost placed piece of the parts 6. In the top position this piece of the parts 6 is cooled, so that it in the phase at the left, where the position of the core is 4", can serve as a part of the mould outline for the finished molding of the part 8. In the phase at the lowest point of the figure with the core in position 4'" is seen the finished molded combined part 6-8 ready for ejection by the use of the two built in jaw parts 9 and 9'.

On FIG. 3 is shown the same tool in open position, where the turnable middle section 3 is able to perform its repeated 90 degrees turnings. It concerns the same four phases with the respective placements of the cores 4, 4', 4" and 4'" as in the other figures. It shall be noticed that in the finishing lowest position is the finished molded combined part 6-8 removed from its core 4'" by the use of the two jaws 9 and 9' which is not yet opened. In this way it is avoided to place any ejectors in the middle section 3 and maybe completely avoiding the use of ejectors in the tool. This design is a great simplifying of the construction of the tool, as well as the opening distance and the build-in height in this way can be minimized in relation to tools with traditional ejectors. But in other cases more traditional ejectors can be used to the tools according to the invention.

FIG. 4 shows the same tool in open position where the difference from FIG. 3 is, that the jaws 9 and 9' are opened, so that the final ejection of the finished combined part 6-8 has been able to take place. This can e.g. be realized by, the not on the drawing shown, ejectors placed under the jaws 9 and 9' or by using compressed air.

On the FIG. 5 is from above shown another solution of the invention, namely where the tool according to the invention is used for the insertion of e.g. metal parts. In the closed tool consisting of the stationary mold part 1 and the movable mold part 2 is shown the two uniform turnable middle sections 3 and 3', which here rotates in opposite directions for the benefit of the balance of the mold. If only the upper part of the middle section is considered you see in the lowest phase the empty mold cavity 5 in the middle section 3. In the next phase at the left on the figure this mold cavity 5 serves in connection with he core 4 from the mold part 1 for the molding of the first part 6 of the plastic part. In the upper phase is added the for the insertion meant part 10 in the half part 6. This can take place while the mold is still closed, which saves time. In the last phase at the right is the last piece of the plastic part 8 molded on, so that the metal part 10 now is firmly encapsulated in the plastic.

In FIG. 6 is shown the same tool in open position where the finished in-molded part 6-10-8 can be ejected after which the process can proceed continuously.

That on the drawing shown is only a couple of examples on how this invention can be transformed into functioning tools. A long row of other designs of he tool according to the invention can be imagined, but the shown examples should be sufficient to show the fundamental principles of the invention.

In that on the drawing shown two-component edition, where the inner piece of the part is molded before the next, you can achieve that the two pieces of the part after the ejection are not that coherent, so that they are not able to be moved in respect of each other, which is relevant by e.g. a screw cap with its adapted tube neck. There could also have been shown an example where you mold the inner mold part at first and then the outermost on top of it, so the two part pieces are more fixed together.

Besides the shown two-component tool there could also have been shown one or more examples of multi-component tools. In a special edition, which is also not shown on the drawing, there can be jaws in both the stationary and/or in the movable mold part, which can be closed completely or partly around the turnable middle-section. Hereby you can e.g. obtain to have four moldable positions, which in this case could be usable for a four component part. These jaws could also be substituted of or combined with core-pull or the like, which opens up for the possibilities of molding very complex multi-component parts, that hardly would have been possible to mold in a traditional way.

Finally there shall be emphasized an example on a tool according to the invention by molding of an one-component subject, where the turnable middle section can substitute a traditional pair of jaws, as the stationary and the movable mold part serves as jaws by the opening- and closing movement in combination with the turnable middle section. Hereby it becomes possible to eject the parts in the direction of movement of the closing unit at the same time as you are molding the parts.

The invention claimed is:

1. A machine for the production of a molded piece, the machine comprising:
   first and second mold parts having opposingly disposed inner surfaces that mate together to form an outer surface of a mold when said first and second mold parts are in a closed position, said first and second mold parts being movable with respect to each other in a transverse direction between said closed position and an open position;
   a turnable middle section rotatable about an axis extending perpendicular to the transverse direction in which the mold parts move, said turnable middle section being disposed between said mold parts;
   a core extending outward from the turnable middle section and/or a cavity extending inward into the turnable middle section, that forms an inner surface of the mold when disposed between the inner surfaces of the mold parts that form the outer surface of the mold in said closed position.

2. The machine according to claim 1 wherein multiple cores and/or cavities are provided and evenly spaced around said turnable middle section.

3. The machine according to claim 1 further comprising a pair of laterally movable jaws for retaining and releasing the molded piece in at least one of the mold parts.

4. The machine according to claim 1 wherein the turnable middle section has a cross-sectional polygon shape.

5. The machine according to claim 4 wherein the core and/or cavity is provided at each face of the turnable middle section forming the polygon shape.

6. The machine according to claim 5 wherein said polygon shape is a square.

7. The machine according to claim 5 wherein said polygon shape is a regular hexagon.

8. The machine according to claim 5 wherein said polygon shape is an octagon.

9. The machine according to claim 5 wherein said polygon shape has an even number of sides, and opposite sides are parallel to each other.

10. The machine according to claim 6 wherein each core and/or cavity of the turnable middle section rotates to four separate positions, a first position located between said mold parts at which a molded piece is formed between the core and/or cavity and the inner surfaces of the mold parts, a second position located in the first mold part, a third position located between said mold parts on an opposite side of the turnable middle section from the first position, and a fourth position located in the second mold part.

11. The machine according to claim 10 wherein at the second position the molded piece is cooled within a chamber in the first mold part.

12. The machine according to claim 10 wherein at the third position a molded component is formed between the molded piece formed at the first position and the inner surfaces of the mold parts.

13. The machine according to claim 10 wherein at the third position a previously formed component is fit over the molded piece.

14. The machine according to claim 10 wherein at the fourth position the molded piece is retained by jaws in the second mold part, and the molded piece is extracted from the core and/or cavity by the opening movement of the molded parts.

15. The machine according to claim 14 wherein the molded piece is released by the opening of said jaws once the molded piece has been extracted from the core/cavity.

16. The machine according to claim 10 wherein at the second position a previously formed component is fit to the molded piece.

17. The machine according to claim 16 wherein at the third position a second molded piece is at least partially formed over the previously formed component.

18. The machine according to claim 17 wherein at the fourth position a unitarily formed molded pieces and component are extracted from the turnable middle section.

19. A method for the production of a molded piece, the method comprising the steps of:
   providing first and second mold parts having opposingly disposed inner surfaces that mate together to form an outer surface of a mold when said first and second mold parts are in a closed position, said first and second mold parts being movable with respect to each other in a transverse direction between said closed position and an open position;

providing a turnable middle section rotatable about an axis extending perpendicular to the transverse direction in which the mold parts move, said turnable middle section being disposed between said mold parts;

providing a core extending outward from the turnable middle section and/or a cavity extending inward into the turnable middle section, that forms an inner surface of the mold when disposed between the inner surfaces of the mold parts that form the outer surface of the mold in said closed position; and forming the molded piece between said core and/or cavity and said mold parts when the mold parts are in a closed position.

20. The method according to claim 19 further comprising the step of providing multiple cores and/or cavities evenly spaced around said turnable middle section.

21. The method according to claim 19 further comprising the step of providing a pair of laterally movable jaws for retaining and releasing a molded piece in at least one of the mold parts.

22. The method according to claim 19 further comprising the step of providing the turnable middle section with a polygon cross-sectional shape.

23. The method according to claim 22 further comprising the step of providing a core and/or cavity at each face of the turnable middle section forming the polygon shape.

24. The method according to claim 23 wherein said polygon shape is a square.

25. The method according to claim 23 wherein said polygon shape is a regular hexagon.

26. The method according to claim 23 wherein said polygon shape is an octagon.

27. The method according to claim 23 wherein said polygon shape has an even number of sides, and opposite side are parallel to each other.

28. The method according to claim 24 further comprising the steps of:

providing four separate positions to which each core and/or cavity rotates;

locating a first position between said mold parts;

forming the molded piece between the core and/or cavity and the inner surfaces of the mold parts at the first position;

locating a second position in the first mold part;

locating a third position between said mold parts on an opposite side of the turnable middle section from the first position; and locating a fourth position in the second mold part.

29. The method according to claim 28 further comprising the step of cooling the molded piece at the second position.

30. The method according to claim 28 further comprising the step of forming a molded component between the molded piece formed at the first position and the inner surfaces of the mold parts.

31. The method according to claim 28 further comprising the step of fitting a previously formed component over the molded piece.

32. The method according to claim 28 further comprising the steps:

providing jaws in the second mold part to retain the molded piece; and extracting the molded piece from the core and/or cavity by the opening movement of the molded parts.

33. The method according to claim 32 further comprising the step of releasing the molded piece by the opening of said jaws once the molded piece has been extracted from the core and/or cavity.

34. The method according to claim 28 further comprising the step of, at the second position, fitting a previously formed component to the molded piece formed at the first position.

35. The method according to claim 34 further comprising the step of, at the third position, at least partially forming a second molded piece over the previously formed component.

36. The method according to claim 35 further comprising the step of, at the fourth position, extracting the unitarily formed molded pieces and component from the turnable middle section.

37. The machine according to claim 1 further comprising at least one previously formed component provided upon said turnable middle section for in-molding within the moldable piece.

38. The method according to claim 19 further comprising the step of providing at least one previously formed component upon said turnable middle section for in-molding within the moldable piece.

* * * * *

(12) EX PARTE REEXAMINATION CERTIFICATE (6994th)
United States Patent
Gram

(10) Number: US 7,150,845 C1
(45) Certificate Issued: Aug. 11, 2009

(54) MOULD WITH TURNTABLE MIDDLE SECTION

(76) Inventor: Jes Tougaard Gram, Bishop Svanes Vej, 5, Birkerød (DK), 3460

Reexamination Request:
No. 90/008,704, Jun. 8, 2007

Reexamination Certificate for:
Patent No.: 7,150,845
Issued: Dec. 19, 2006
Appl. No.: 09/979,687
Filed: Apr. 24, 2003

(22) PCT Filed: May 15, 2000
(86) PCT No.: PCT/DK00/00261
§ 371 (c)(1),
(2), (4) Date: Apr. 24, 2003
(87) PCT Pub. No.: WO00/73040
PCT Pub. Date: Dec. 7, 2000

(30) Foreign Application Priority Data
May 17, 1999 (DK) .................................. 1999 00670

(51) Int. Cl.
*B29C 45/04* (2006.01)
*B29C 45/14* (2006.01)
*B29C 45/16* (2006.01)

(52) U.S. Cl. ............... 264/254; 264/255; 264/275; 264/297.2; 264/328.8; 425/116; 425/129.1; 425/576; 425/572; 425/127

(58) Field of Classification Search .................... None
See application file for complete search history.

(56) References Cited

U.S. PATENT DOCUMENTS 3,733,162 A 5/1973 Farkas
3,985,485 A 10/1976 Farrell
4,449,913 A 5/1984 Krishnakumar et al.

*Primary Examiner*—Krisanne Jastrzab

(57) ABSTRACT

A method and molding tool for the molding of both one—or multi-component parts preferably comprising plastic material which may be integrated together with parts of another material, such as steel and copper, where the turnable middle section during the molding process is supplied with material on at least one of the surfaces thereof, that in contrast to the normal procedures are not at a right angle to the closing direction between the stationary mold part and the movable mold part of the tool. This can be realized by molding a part or a piece of a part and/or by molding around a special part for the in-molding on at least one of these surfaces of the turnable middle section. This molding and/or insertion can take place while the tool is closed and can be performed on several surfaces at the same time in order to save cycle time. The tool according to the invention can substitute or supplement a jaw tool because the turnable middle section in connection with the opening and closing of the stationary mold part and the movable mold part makes these serve as an extra set of jaws.

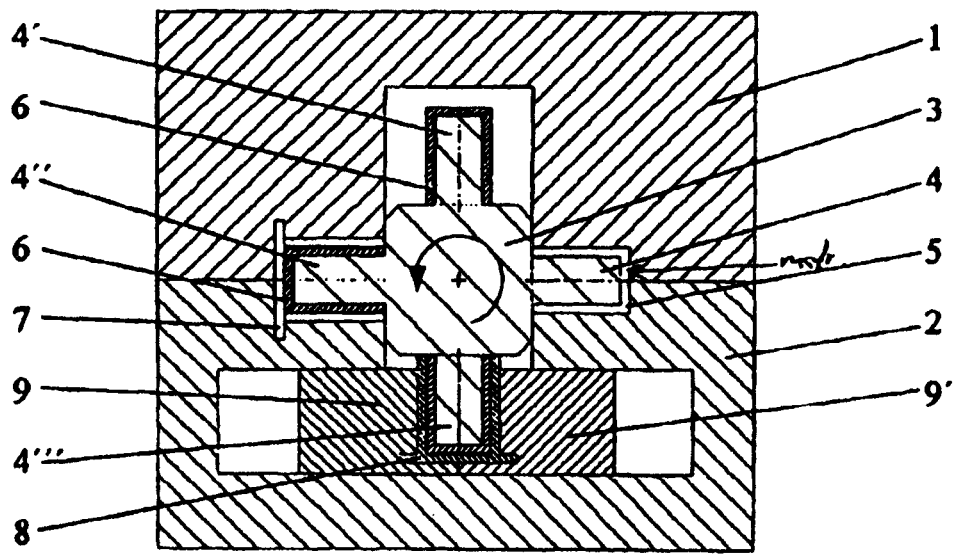

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 37 is cancelled.

Claims 1, 10–19, 28–36 and 38 are determined to be patentable as amended.

Claims 2–9 and 20–27, dependent on an amended claim, are determined to be patentable.

1. A machine for the production of a molded piece, the machine comprising:
  first and second mold parts having opposingly disposed inner surfaces that mate together to form [an] outer [surface] *surfaces* of [a mold] *mold cavities* when said first and second mold parts are in a closed position, said first and second mold parts being movable with respect to each other in a transverse direction between said closed position and an open position, *said first and second mold parts defining first and second mold cavities wherein first and second parts can be formed*;
  a turnable middle section rotatable about an axis extending perpendicular to the transverse direction in which the mold parts move, said turnable middle section being disposed between said mold parts;
  a core extending outward from the turnable middle section and/or a cavity extending inward into the turnable middle section, that forms an inner surface of *at least one of* the mold *cavities* when disposed between the inner surfaces of the mold parts that form the outer surface of *at least one of* the mold *cavities* in said [dosed] *closed* position;
  *wherein when said turnable middle section is in a first position and when said first and second mold parts are in said closed position, a first molded piece is molded in said first mold cavity, thereafter, said first and second mold parts are moved to the open position, the middle section is rotated to a second position whereat the first molded piece is rotated into the second mold cavity, thereafter the first and second mold parts are moved to the closed position and a second molded piece is molded over the first molded piece to form a unitarily formed molded piece, and wherein at least one of the first mold cavity and the second mold cavity is defined by a portion of the first mold part, a portion of the second mold part, and a portion of the turnable middle section.*

10. The machine according to claim 6 wherein each core and/or cavity of the turnable middle section rotates to four separate positions, a first position located between said mold parts of which [a] *the first* molded piece is formed between the core and/or cavity and the inner surfaces of the mold parts, a second position located in the first mold part, a third position located between said mold parts on an opposite side of the turnable middle section from the first position, and a fourth position located in the second mold part.

11. The machine according to claim 10 wherein at the second position the *first* molded piece is cooled within a chamber in the first mold part.

12. The machine according to claim 10 wherein at the third position a molded component is formed between the *first* molded piece formed at the first position and the inner surfaces of the mold parts.

13. The machine according to claim 10 wherein at the third position a previously formed component is fit over the *first* molded piece.

14. The machine according to claim 10 wherein at the fourth position the *unitarily formed* molded piece is retained by jaws in the second mold part, and the *unitarily formed* molded piece is extracted from the core and/or cavity by the opening movement of the molded parts.

15. The machine according to claim 14 wherein the *unitarily formed* molded piece is released by the opening of said jaws once the *unitarily formed* molded piece has been extracted from the core/cavity.

16. The machine according to claim 10 wherein at the second position a previously formed component is fit to the *first* molded piece.

17. The machine according to claim 16 wherein at the third position [a] *the* second molded piece is at least partially formed over the previously formed component.

18. The machine according to claim 17 wherein at the fourth position [a] *the* unitarily formed molded [pieces] *piece* and component are extracted from the turnable middle section.

19. A method for the productin of a molded piece, the method comprising the steps of:
  providing first and second mold parts having opposingly disposed inner surfaces that mate together to form an outer surface of a mold when said first and second mold parts are in a closed position, said first and second mold parts being movable with respect to each other in a transverse direction between said closed position and an open position;
  providing a turnable middle section rotatable about an axis extending perpendicular to the transverse direction in which the mold parts move, said turnable middle section being disposed between said mold parts;
  providing a core extending outward from the turnable middle section and/or a cavity extending inward into the turnable middle section, that forms an inner surface of the mold when disposed between the inner surfaces of the mold parts that form the outer surface of the mold in said closed position; [and]
  *providing a mold cavity defined by a portion of the first mold part, a portion of the second mold part, and a portion of the turnable middle section;*
  forming [the] *a first* molded piece [between said core and/or cavity and said mold parts when the mold parts are in a closed position] *in the mold cavity, said first molded piece having a face*;
  *opening said first and second mold parts after the first molded piece is formed; and*
  *forming the second molded piece onto and substantially conforming to the face of the first molded piece to form a unitarily formed molded piece.*

28. The method according to claim 24 further comprising the steps of:
  providing four separate positions to which each core and/or cavity rotates;

locating a first position between said mold parts;

forming the *first* molded piece between the core and/or cavity and the inner surfaces of the mold parts at the first position;

locating a second position in the first mold part;

locating a third position between said mold parts on an opposite side of the turnable middle section from the first position; and locating a fourth position in the second mold part.

29. The method according to claim 28 further comprising the step of cooling the *first* molded piece at the second position.

30. The method according to claim 28 further comprising the step of forming a molded component between the *first* molded piece formed at the first position and the inner surfaces of the mold parts.

31. The method according to claim 28 further comprising the step of fitting a previously formed component over the *first* molded piece.

32. The method according to claim 28 further comprising the steps:

providing jaws in the second mold part to retain the *unitarily formed* molded piece; and extracting the *unitarily formed* molded piece from the core and/or cavity by the opening movement of the molded parts.

33. The method according to claim 32 further comprising the step of releasing the *unitarily formed* molded piece by the opening of said jaws once the *unitarily formed* molded piece has been extracted from the core and/or cavity.

34. The method according to claim 28 further comprising the step of, at the second position, fitting a previously formed component to the *first* molded piece formed at the first position.

35. The method according to claim 34 further comprising the step of, at the third position, at least partially forming [a] *the* second molded piece over the previously formed component.

36. The method according to claim 35 further comprising the step of, at the fourth position, extracting the unitarily formed molded [pieces] *piece* and component from the turnable middle section.

38. The method according to claim 19 further comprising the step of [providing at least one previously formed component upon said turnable middle section for in-molding within the moldable piece] *inserting at least one previously formed component between said first and second molded pieces.*

\* \* \* \* \*